(12) United States Patent
Saksena et al.

(10) Patent No.: US 8,306,039 B2
(45) Date of Patent: Nov. 6, 2012

(54) METHODS AND SYSTEMS FOR AUTOMATIC TRANSPORT PATH SELECTION FOR MULTI-HOMED ENTITIES IN STREAM CONTROL TRANSMISSION PROTOCOL

(75) Inventors: Anubhav Saksena, New Delhi (IN); Vijay Kumar Choudhary, Gurgaon (IN); Prashant Vashisht, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 326 days.

(21) Appl. No.: 12/364,864

(22) Filed: Feb. 3, 2009

(65) Prior Publication Data

US 2010/0150161 A1    Jun. 17, 2010

(30) Foreign Application Priority Data

Dec. 15, 2008 (IN) .......................... 2822/DEL/2008

(51) Int. Cl.
*H04L 12/28* (2006.01)
(52) U.S. Cl. ...................................................... 370/400
(58) Field of Classification Search .................. 370/400
See application file for complete search history.

(56) References Cited

U.S. PATENT DOCUMENTS

| | | | |
|---|---|---|---|
| 7,885,209 B1* | 2/2011 | Michaelis et al. ............ 370/263 |
| 2003/0088529 A1* | 5/2003 | Klinker et al. .................... 706/3 |
| 2003/0120716 A1* | 6/2003 | McClellan et al. ........... 709/201 |
| 2003/0235151 A1* | 12/2003 | McClellan ..................... 370/216 |
| 2007/0159977 A1* | 7/2007 | Dalal et al. .................... 370/238 |
| 2008/0025208 A1* | 1/2008 | Chan ............................. 370/217 |
| 2008/0084826 A1* | 4/2008 | Ong .............................. 370/237 |

OTHER PUBLICATIONS

Network Working Group RFC4960 by Stewart on Sep. 2007.*
Stewart; "RFC 4960—Stream Control Transmission Protocol"; Network Working Group Memo; Oct. 17, 2008.

* cited by examiner

*Primary Examiner* — Ayaz Sheikh
*Assistant Examiner* — Hai-Chang Hsiung
(74) *Attorney, Agent, or Firm* — Clements Bernard PLLC; Christopher L. Bernard; Lawrence A. Baratta, Jr.

(57) ABSTRACT

The present disclosure provides methods and systems for automatic transport path selection for multi-home entities in Stream Control Transmission Protocol (SCTP). The present invention provides systems and methods for directing data transfer between applications and devices residing on different computers or devices using a dynamic path selection algorithm for multi-homed network entities (using SCTP). When an application or device requests to transfer data to another application or device, the dynamic path selection algorithm selects the most efficient path for data transfer. The decision to select the best network path is based upon the dynamic network conditions, such as, for example, congestion window (CWND), round trip time (RTT), and the like, and/or provisioning information.

17 Claims, 6 Drawing Sheets

METHODS AND SYSTEMS FOR AUTOMATIC TRANSPORT PATH SELECTION FOR MULTI-HOMED ENTITIES IN STREAM CONTROL TRANSMISSION PROTOCOL

CROSS-REFERENCE TO RELATED APPLICATION(S)

The present non-provisional patent claims the benefit of priority of co-pending Indian Patent Application No. 2822/DEL/2008, filed on Dec. 15, 2008, and entitled "METHODS AND SYSTEMS FOR AUTOMATIC TRANSPORT PATH SELECTION FOR MULTI-HOMED ENTITIES IN STREAM CONTROL TRANSMISSION PROTOCOL," the contents of which are incorporated in full by reference herein.

FIELD OF THE INVENTION

The present invention relates generally to data networking. More particularly, the present invention provides methods and systems for automatic transport path selection for multi-home entities in Stream Control Transmission Protocol (SCTP).

BACKGROUND OF THE INVENTION

The Stream Control Transmission Protocol (SCTP) is a Transport Layer protocol, serving in a similar role as the popular protocols Transmission Control Protocol (TCP) and User Datagram Protocol (UDP). SCTP provides some of the same service features of both TCP and UDP, ensuring reliable, in-sequence transport of messages with congestion control. SCTP was defined by the Internet Engineering Task Force (IETF) Signaling Transport (SIGTRAN) in Request for Comments: 4960 (RFC 4960) "Stream Control Transmission Protocol," September 2007, the contents of which are incorporated by reference herein.

SCTP is a reliable transport protocol operating on top of a connectionless packet network such as Internet Protocol (IP). Advantageously, SCTP offers the following services to its users: acknowledged error-free non-duplicated transfer of user data; data fragmentation to conform to discovered path maximum transmission unit (MTU) size; sequenced delivery of user messages within multiple streams, with an option for order-of-arrival delivery of individual user messages; optional bundling of multiple user messages into a single SCTP packet; and network-level fault tolerance through supporting of multi-homing at either or both ends of an association.

Whereas TCP is stream-oriented, i.e., transports byte streams, SCTP is transaction-oriented, meaning it transports data in one or more messages. A message is a group of bytes sent in one transaction (transmit operation). Although TCP correctly reorders data that arrives out of order, it is concerned only with bytes. TCP does not honor message boundaries, i.e., the structure of data in terms of their original transmission units at the sender. SCTP, in contrast, conserves message boundaries by operating on whole messages in a fashion similar to UDP. This means that a group of bytes that is sent in one transmission operation (transaction) is read exactly as that group, called message, at the receiver.

TCP provides both reliable data transfer and strict order-of-transmission delivery of data. Some applications need reliable transfer without sequence maintenance, while others would be satisfied with partial ordering of the data. In both of these cases, the head-of-line blocking offered by TCP causes unnecessary delay. The stream-oriented nature of TCP is often an inconvenience. Applications must add their own record marking to delineate their messages, and must make explicit use of the push facility to ensure that a complete message is transferred in a reasonable time. The limited scope of TCP sockets complicates the task of providing highly-available data transfer capability using multi-homed hosts. TCP is relatively vulnerable to denial-of-service attacks, such as SYN attacks.

In SCTP reliable data transfer between two end points is achieved by sending data on primary path which is decided as soon as the association is established. There is also an option of having a secondary path for a multi-homed host. In the current SCTP architecture, there is no mechanism to identify which path (primary or secondary) is more efficient (in terms of round trip time (RTT), Congestion Window (CWND), and other parameters). The SCTP packets continue to traverse the primary path until it goes down, even if there is a better secondary path available. Also, in the current scheme of SCTP the switchover from primary to secondary path is non-revertive.

BRIEF SUMMARY OF THE INVENTION

In various exemplary embodiments, the present invention provides methods and systems for automatic transport path selection for multi-home entities in Stream Control Transmission Protocol (SCTP). The present invention provides systems and methods for directing data transfer between applications and devices residing on different computers or devices using a dynamic path selection algorithm for multi-homed network entities (using SCTP). When an application or device requests to transfer data to another application or device, the dynamic path selection algorithm selects the most efficient path for data transfer. The decision to select the best network path is based upon the dynamic network conditions, such as, for example, congestion window (CWND), round trip time (RTT), and the like, and/or provisioning information.

In an exemplary embodiment of the present invention, a method for transport path selection for multi-homed paths in Stream Control Transmission Protocol includes establishing a Stream Control Transmission Protocol association for two or more paths; monitoring statistics on the two or more paths; comparing the statistics on the two or more paths; selecting an optimal path of the two or more paths responsive to the statistics; communicating the selected optimal path to a peer node; and starting data transfer on the optimal path. The method can further include checking if dynamic path switching is enable prior to the monitoring step; if dynamic path switching is not enabled, continuing normal Stream Control Transmission Protocol operation on a primary path of the two or more paths. Optionally, the method further includes waiting to receive an acknowledgment from the peer node prior to the starting step. The comparing step can include applying a formula to each of the statistics from the two or more paths, and selecting step can be performed responsive to the formula. The formula is a function of congestion window and round trip time for each of the two or more paths. The statistics can include congestion window and round trip time for each of the two or more paths. The method can also further include repeating the monitoring, comparing, selecting, communicating, and starting steps at a predetermined interval; and implementing a hysteresis loop to avoid path flipping under transient network conditions. Optionally, the method further includes configuring a plurality of user-configurable parameters associated with the transport path selection; wherein the plurality of user-configurable parameters include any of dynamic path switching on/off, revertive/non-revertive path switch, user preference/weighting to individual network paths, sampling frequency, number of samples to be considered for calculating a weighted average, and switching based on symmetric/asymmetric application requirements. Alternatively, the method further includes transmitting Stream Control Transmission Protocol chunks to the peer node; and receiving Stream Control Transmission Protocol chunks from the peer node; wherein the Stream Control Transmission Protocol chunks include any of algorithm on/off messages to enable/disable the transport path selection, switching request notification, switch request confirmation, and data messages including the statistics.

In another exemplary embodiment of the present invention, a device operating Stream Control Transmission Protocol includes a network interface connected to a network, wherein the network interface utilizes Stream Control Transmission Protocol; two or more paths in the network between the network interface and a peer node; a processor configured to control the network interface, wherein the processor is configured to execute dynamic path switching configured to: establish a Stream Control Transmission Protocol association on the two or more paths between the network interface and the peer node; monitor statistics on the two or more paths; select an optimal path of the two or more paths responsive to the monitored statistics; communicate the optimal path to the peer node; and transfer data on the optimal path. The processor can be further configured to: enable/disable dynamic path switching; operate normal Stream Control Transmission Protocol operation on a primary path of the two or more paths if dynamic path switching is disabled. Optionally, the processor is further configured to: apply a formula to each of the statistics from the two or more paths, wherein the statistics are monitored at predetermined times, and wherein the statistics include congestion window and round trip time for each of the two or more paths; use the formula to select the optimal path; wherein the formula is a function of the congestion window and round trip time for each of the two or more paths. Alternatively, the processor is further configured to: continuously monitor and select the optimal path; and operate a hysteresis loop to avoid path flipping under transient network conditions. The device can further include a plurality of user-configurable parameters associated with dynamic path switching; wherein the plurality of user-configurable parameters include any of dynamic path switching on/off, revertive/non-revertive path switch, user preference/weighting to individual network paths, sampling frequency, number of samples to be considered for calculating a weighted average, and switching based on symmetric/asymmetric application requirements. The network interface and the peer node are each configured to transmit and receive a plurality of Stream Control Transmission Protocol chunks; wherein the Stream Control Transmission Protocol chunks include any of algorithm on/off messages to enable/disable the dynamic path switching, switching request notification, switch request confirmation, and data messages including the statistics.

In yet another exemplary embodiment of the present invention a network operating Stream Control Transmission Protocol includes a first node; a second node; and two or more paths interconnecting the first node and the second node; wherein the first node and the second node communicate utilizing Stream Control Transmission Protocol; and wherein the first node and the second node utilize a dynamic path switching algorithm on the two or more paths to establish an association on the two or more paths and to select an optimal path of the two or more paths responsive to monitored statistics. The monitored statistics include congestion window and round trip time for each of the two or more paths; wherein the optimal path is selected based on a weighted function including the congestion window and the round trip time for each of the two or more paths. The network can further include a plurality of Stream Control Transmission Protocol chunks exchanged between the first node and the second node; wherein the Stream Control Transmission Protocol chunks include any of algorithm on/off messages to enable/disable the dynamic path switching, switching request notification, switch request confirmation, and data messages including the statistics. Optionally, the network further includes a plurality of user-configurable parameters associated with dynamic path switching algorithm; wherein the plurality of user-configurable parameters include any of dynamic path switching algorithm on/off, revertive/non-revertive path switch, user preference/weighting to individual network paths, sampling frequency, number of samples to be considered for calculating a weighted average, and switching based on symmetric/asymmetric application requirements.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present invention provides methods and systems for automatic transport path selection for multi-home entities in Stream Control Transmission Protocol (SCTP). The present invention provides systems and methods for directing data transfer between applications and devices residing on different computers or devices using a dynamic path selection algorithm for multi-homed network entities (using SCTP). When an application or device requests to transfer data to another application or device, the dynamic path selection algorithm selects the most efficient path for data transfer. The decision to select the best network path is based upon the dynamic network conditions, such as, for example, congestion window (CWND), round trip time (RTT), and the like, and/or provisioning information.

The present invention includes an Automatic transport path selection algorithm used along with SCTP, and the algorithm is configured to select the best network path. Advantageously, with the present invention, applications running over SCTP achieve a higher degree of robustness and always run on an optimal network path. Accordingly, the present invention contemplates use with any application using the SCTP protocol as the underlying transport protocol. For example, the present invention can be utilized in routers, switches, storage area network (SAN) devices, computers, Voice over Internet Protocol (VoIP) devices, and the like.

Figure 1:
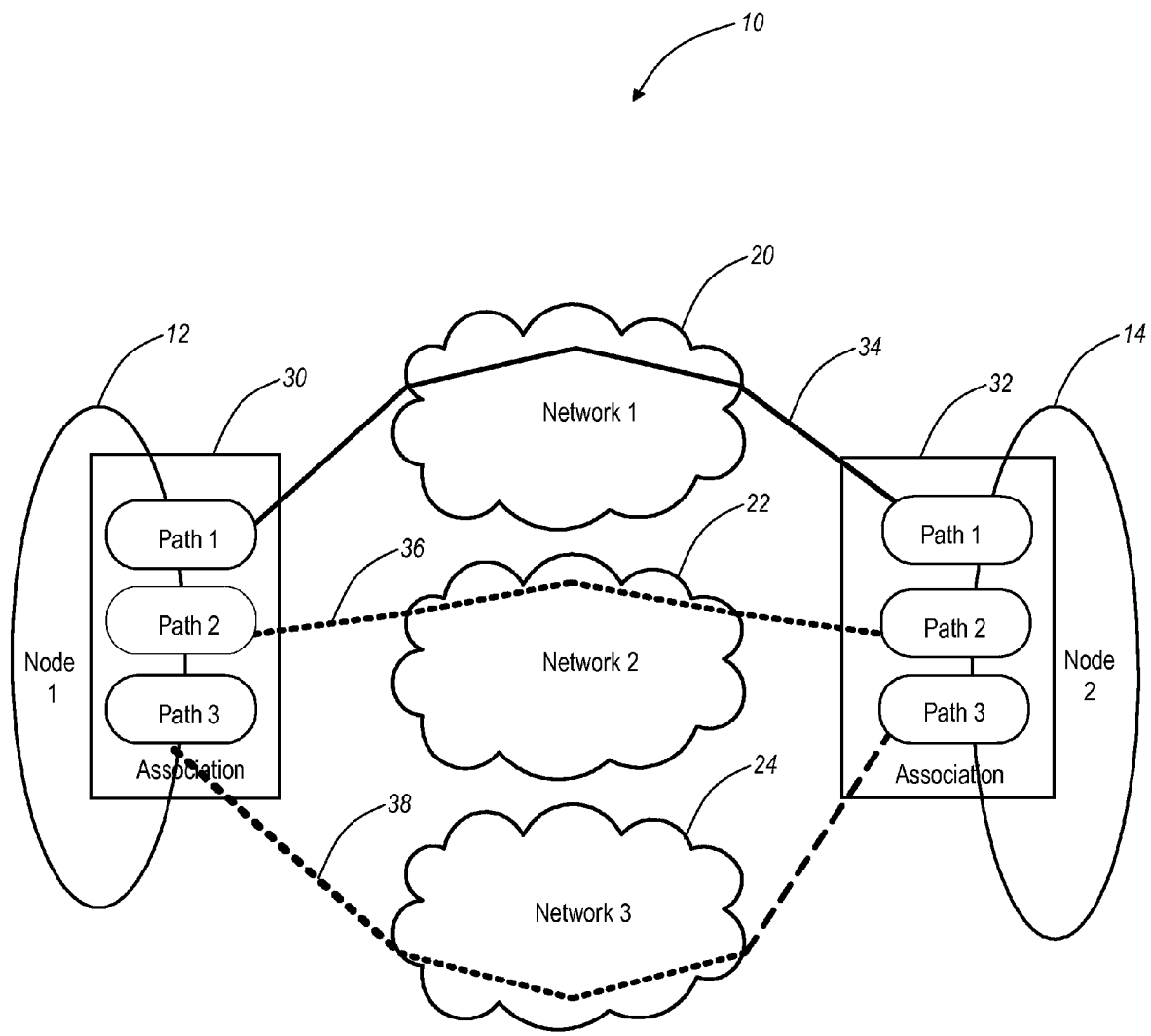
FIG. 1 illustrates a network configuration illustrating two nodes interconnected through three different networks according to an exemplary embodiment of the present invention.

Referring to FIG. 1, a network configuration 10 illustrates two nodes, node 1 12 and node 2 14, interconnected through three different networks 20, 22, 24 according to an exemplary embodiment of the present invention. The nodes 12, 14 can include, for example, routers, switches, storage area network (SAN) devices, computers, VoIP devices, and the like. The different networks 20, 22, 24 are transport networks utilizing SCTP. Each of the different networks 20, 22, 24 has different congestion/traffic conditions which vary with time.

The nodes 12, 14 have respective associations 30, 32 under SCTP with three paths, path 1 34, path 2 36, and path 3 38, through the three different networks 20, 22, 24, respectively. Specifically, the nodes 12, 14 are multi-homed entities with the three different paths 34, 36, 38. Conventionally, node 1 12 communicates to node 2 14 through a primary designated path, e.g., path 1 34, with the remaining paths 36, 38 acting as secondary paths for redundancy. These remaining paths 36, 38 are unused unless path 1 34 is unavailable.

Assume c represents a Congestion window (CWND) value. The CWND is an SCTP variable that limits the data, in number of bytes, a sender can send to a particular destination transport address before receiving an acknowledgement. Also assume r represents RTT (Round trip time) which is a measurement in SCTP of the time for a round trip transmission. Accordingly, the network 1 20 has a congestion of $c_1$, RTT value $r_1$, the network 2 22 has a congestion of $c_2$, RTT value $r_2$, and the network 3 24 has a congestion of $c_3$, RTT value $r_3$. The performance of the paths 34, 36, 38 depends on the network conditions such as c and r (among other things).

In currently available transport protocol (e.g., SCTP), there is no check on which path 34, 36, 38 (primary or secondary) is more efficient (i.e., in terms of RTT, CWND, etc.). The primary path, e.g., path 1 34, remains the same until it goes down. Also, whenever there is a switch from primary path to a secondary path, e.g., paths 2 36, 3 38, the primary path may restore in some time, but in the present SCTP protocol, the application does not switch back to the primary path even if the performance of primary path is better, i.e., a non-revertive scheme.

In an exemplary embodiment of the present invention, the nodes 12, 14 are each configured to execute an automatic transport path selection algorithm 50 (FIG. 2) that ensures the network configuration 10 utilizes an optimal path of the paths 34, 36, 38 based on statistical monitoring of the paths 34, 36, 38. For example, the automatic transport path selection algorithm 50 can utilize r and c for determining which of the paths 34, 36, 38 is optimal. The automatic transport path selection algorithm 50 can be executed on any pair of multi-homed entities with two or more connecting paths, e.g., the network configuration 10 illustrates three paths 34, 36, 38.

Figure 2:
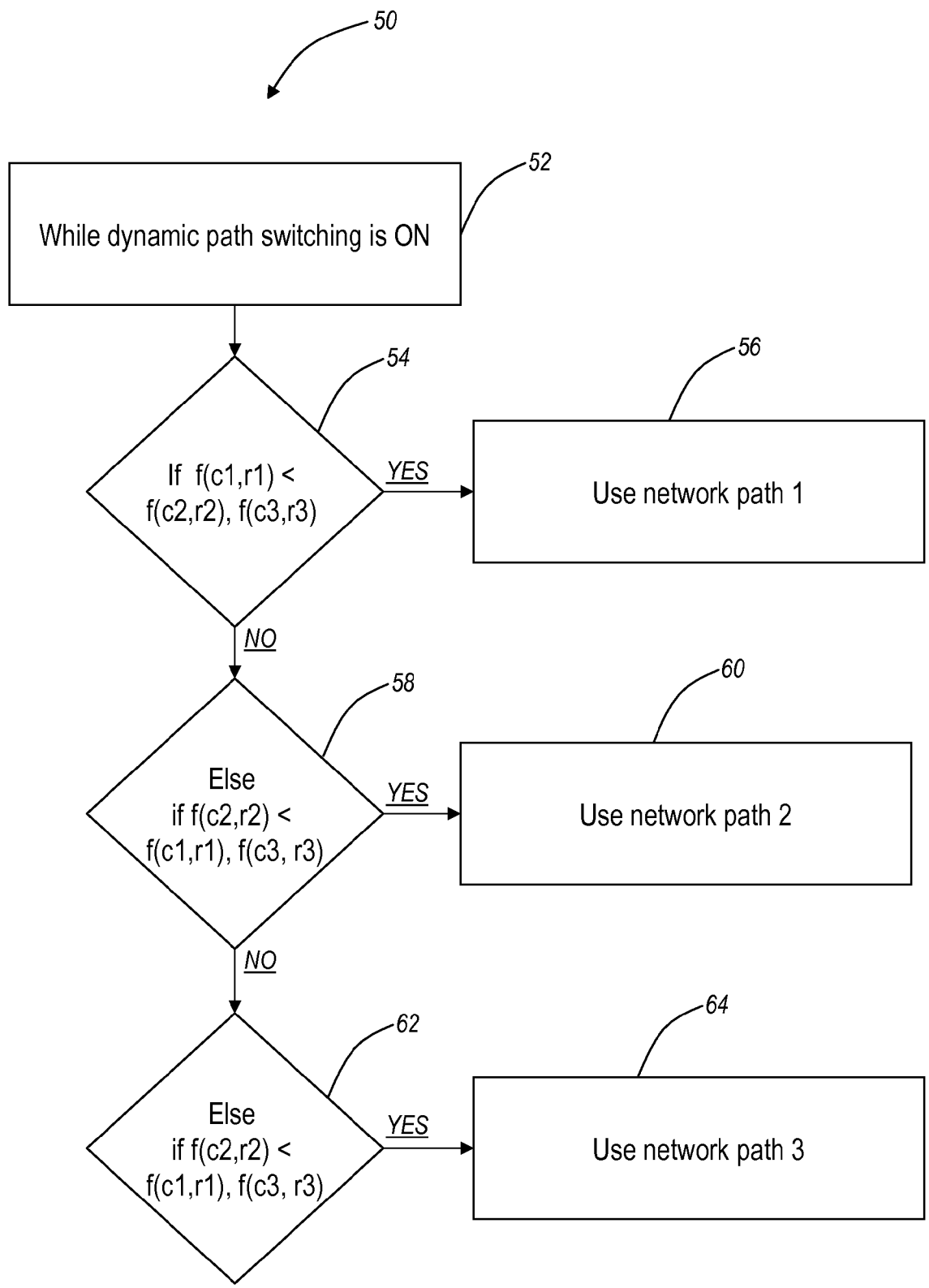
FIG. 2 illustrates a flowchart of an automatic transport path selection algorithm for Stream Control Transmission Protocol (SCTP) according to an exemplary embodiment of the present invention.

Referring to FIG. 2, a flowchart illustrates the automatic transport path selection algorithm 50 according to an exemplary embodiment of the present invention. In various exemplary embodiments, the present invention ensures that SCTP (and hence the applications) use the optimal path based on statistical monitoring of various transport paths based on r and c, for example. For example, the algorithm 50 can sample RTT at regular predetermined intervals (e.g., 5s), and based on the RTT of different destinations, the algorithm 50 selects the best path for data transmission.

The automatic transport path selection algorithm 50 operates while dynamic switching is set to ON (step 52). Here, a user can select whether they want the algorithm 50 enabled. The algorithm 50 includes a function, f, that is based on c and r. Optionally, the algorithm 50 can include other variables in addition to or in place of c and/or r. If $f(c_1, r_1) < f(c_2, r_2)$, $f(c_3, r_3)$ (step 54), then the algorithm 50 uses the network path 1 34 (step 56). If $f(c_2, r_2) < f(c_1, r_1)$, $f(c_3, r_3)$ (step 58), then the algorithm 50 uses the network path 2 36 (step 60). Finally, $f(c_3, r_3) < f(c_2, r_2)$, $f(c_1, r_1)$ (step 62), then the algorithm 50 uses the network path 1 34 (step 64).

The automatic transport path selection algorithm 50 is illustrated with respect to the network configuration 10 in FIG. 1. Those of ordinary skill in the art will recognize that the automatic transport path selection algorithm 50 can apply to any SCTP nodes with two or more paths with the function, f, based on r, c, and the like associated with each of the two or more paths.

Figure 3:
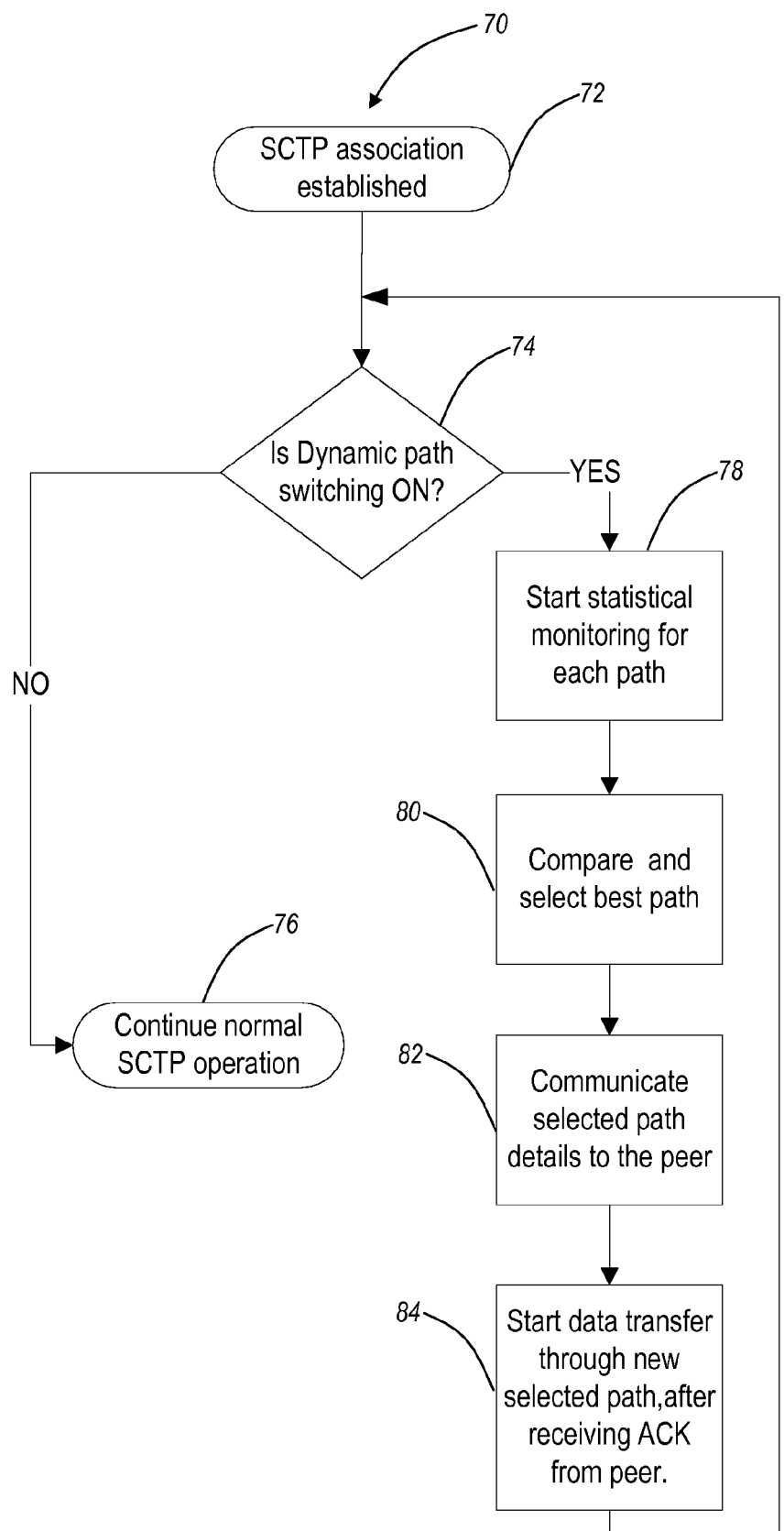
FIG. 3 illustrates a flowchart of an exemplary operation of a SCTP automatic path selection algorithm according to an exemplary embodiment of the present invention.

Referring to FIG. 3, a flowchart illustrates an exemplary operation of an SCTP automatic path selection algorithm 70 according to an exemplary embodiment of the present invention. The SCTP automatic path selection algorithm 70 illustrates operations between nodes on an SCTP network, e.g., nodes 12, 14 in FIG. 1. A SCTP association is established between the two nodes (step 72). Here, the two nodes complete an initialization process in order to set up an SCTP association between them. This can include the Association Initialization described in RFC 4960, Section 5. For example, the two nodes exchange INIT, INIT ACK, COOKIE-ECHO, and COOKIE-ACK chunks where a chunk is a unit of information within an SCTP packet including a chunk header and chunk-specific content.

The algorithm 70 checks if dynamic path switching is on (step 74). The present invention can include various user-configurable parameters, such as, for example, dynamic path switching on/off, revertive/non-revertive path switch, user preference/weighting to individual network paths, sampling frequency, number of samples to be considered for calculating the weighted average, and the like. The dynamic path switching enables or disables the algorithm 70. The revertive/non-revertive path switch can include a default of non-revertive, and this is utilized to determine whether the algorithm 70 switches back to a restored path after a failure switch. The user preference/weighting allows paths to be weighted to alter the algorithm 70. For example, paths with higher costs can be weighted accordingly. The sampling frequency can determine how often the algorithm 70 checks the various cost parameters.

Additionally, the algorithm 70 can switch based on symmetric or asymmetric application requirements. For example, storage applications may be interested in RTT from one direction only whereas for interactive applications RTT in both the directions shall be taken into consideration before the path switching is triggered. The symmetric or asymmetric application requirements can also be a user-configurable parameter.

If the dynamic path switching is off (step 74), then the nodes continue normal SCTP operation (step 76). If the dynamic path switching is on (step 74), then the algorithm 70 starts statistical monitoring for each path (step 78). Here, the nodes utilize various SCTP mechanisms to determine r, c, etc. over a predetermined sampling period. Once the statistics are gathered, the algorithm 70 can compare and select the best path (step 80). Here, the algorithm 70 can utilize a function, f, such as described in FIG. 2 to determine which of the paths is optimal. For example, the function can utilize the weightings in the optimal path calculation.

Once the optimal path is selected by the algorithm 70, it is communicated to the peer node (step 82). Finally, data transfer is started over the selected path after receiving an ACK from the peer node (step 84). Afterwards, the algorithm 70 can return to step 74 to continue checking for the optimal path. Alternatively, the algorithm 70 can end and restart after a predetermined interval or at an occurrence of a predetermined event.

Referring back to FIG. 1, an exemplary operation of the algorithm 70 is described between the nodes 12, 14. The association between the nodes 12, 14 includes the three paths 34, 36, 38. For example, assume the nodes 12, 14 start by using the path 1 34 as the default primary path. Once the dynamic path switching is turned ON, the node 12 runs the algorithm 70 on all three paths 34, 36, 38, and as it realizes that path 2 36 or path 3 38 provides a more optimal route than path 1 34, the node 12 triggers the path switching. Additionally, the node 14 can also run the algorithm 70 in the opposite direction to the node 12.

The path switching involves a handshake mechanism between the node 12 and the node 14 to agree on the switch decision, which leads to designating the path 2 36 or the path 3 38 as the new primary path and all further data traffic is now be sent on this newly selected path. The dynamic path selection algorithm 70 can continue to run in the background.

The present invention can also include a hysteresis loop in the algorithm 70 so that route flipping does not occur in case of transient network conditions, i.e., continuing switching between the paths. Moreover, the dynamic path switching is configurable to be revertive (in which case it has a bias to switch back to the original primary path) or non-revertive (in which case the algorithm 70 has no bias). Note, either side could independently trigger the path switch.

Figure 4A:
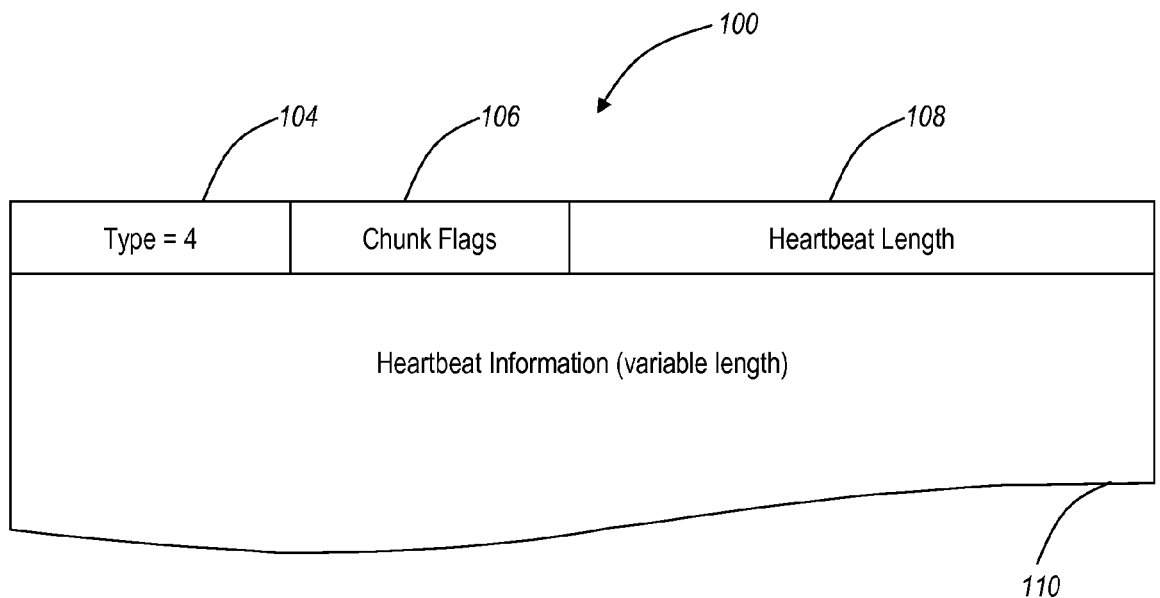
FIGS. 4a and 4b illustrate exemplary heartbeat messages for use with the SCTP automatic path selection algorithm of FIG. 3 according to an exemplary embodiment of the present invention.
Figure 4B:
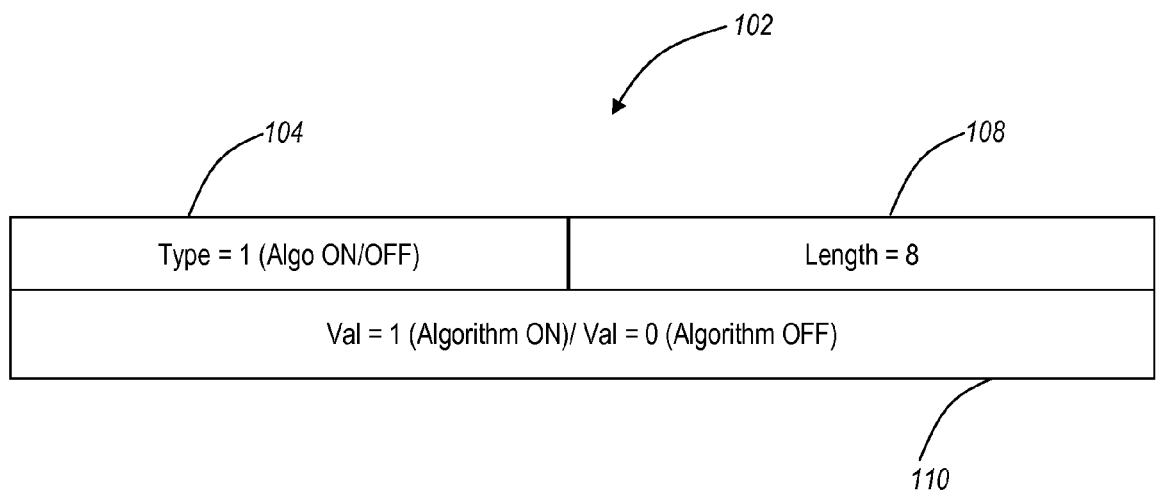

Referring to FIGS. 4a and 4b, exemplary heartbeat messages 100, 102 are illustrated for use with the SCTP automatic path selection algorithm 70 according to an exemplary embodiment of the present invention. The present invention includes various messages types that can be exchanged between two SCTP endpoints. These messages can be exchanged in SCTP chunks. For example, these messages can include algorithm ON indication, algorithm OFF indication, switch request notification, switch request confirmation, data messages, RTT, CWND, and the like.

SCTP packets have a simpler basic structure than TCP or UDP packets. Each SCTP packet includes a common header, which occupies the first 12 bytes, and data chunks, which occupy the remaining portion of the packet. FIG. 4a illustrates a heartbeat message 100 in an SCTP chunk. FIG. 4b illustrates a heartbeat message 102 in an SCTP chunk for transmitting an algorithm ON/OFF message between the two endpoints.

Each chunk has a type identifier 104 that is one byte long yielding, at most, 255 different chunk types. RFC 4960 defines a list of chunk types and there are currently 15 types defined. The chunk can also include chunk flags 106 which are dependent on the chunk type. The remainder of the chunk is a two byte length 108 (maximum size of 65,535 bytes) and chunk data 110. If the chunk does not form a multiple of 4 bytes (i.e., the length is not a multiple of 4) then it is implicitly padded with zeros which are not included in the chunk length.

Figure 5:
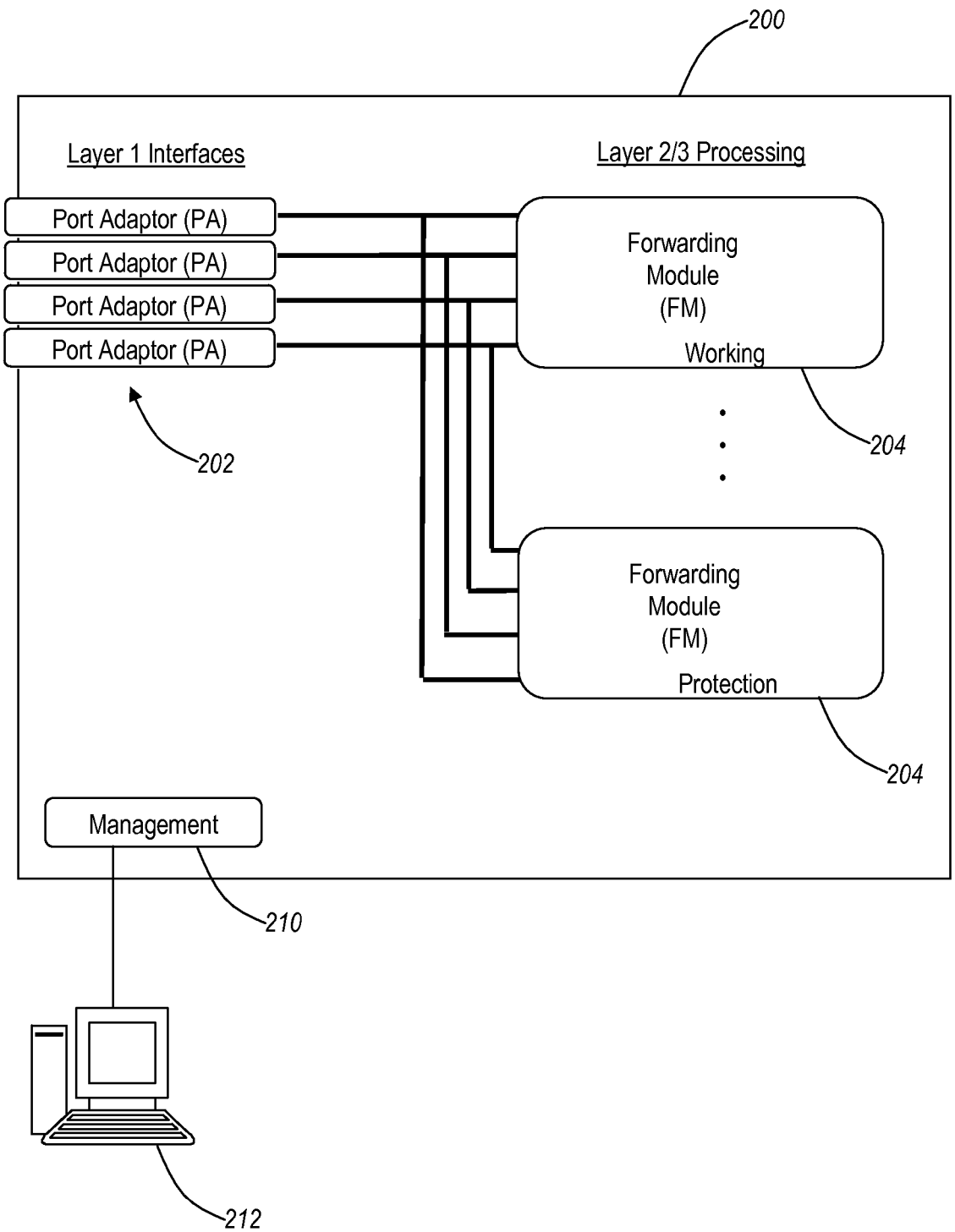
FIG. 5 illustrates a block diagram of a switch for providing dynamic path switching according to an exemplary embodiment of the present invention.

As illustrated in FIG. 4b, the present invention can utilize SCTP chunks for operating the algorithm 70. For example, the heartbeat message 102 is utilized to configure the algorithm 70. Here, the type identifier 104 is set to a value of 1 for initiation. The length 108 is set to a value of 8, and the data 110 includes a value for determining whether dynamic path switching is engaged or disabled. Other chunks can be utilized to communicate statistical information (r and c values, etc.), switching initiation, and the like Referring to FIG. 5, a block diagram of a switch 200 for providing dynamic path switching is illustrated according to an exemplary embodiment of the present invention. The switch 200 is configured to provide layer 2/3 processing and to utilize SCTP and the dynamic path switching algorithms described herein. The switch 200 generally includes multiple port adaptors 202 interconnected, such as through a backplane, mid-plane, or the like, to working and protect forwarding modules 204. Those of ordinary skill in the art will recognize that the dynamic path switching mechanisms described herein can apply to any switch or other network element device, and that the switch 200 of FIG. 5 is provided for illustration purposes.

The port adaptors 202 provide physical layer zero/one connectivity to the network. For example, each port adaptor 202 can include multiple, independent ports. Ports can include Ethernet (10/100/1000GbE), Optical (OC-3/STM-3, OC-12/STM-4, OC-48/STM-16), ATM, DS3/E3, Frame Relay, TDM over Packet, and the like.

The forwarding modules 204 are configured in a work and protection configuration, such as 1:N and the like. Generally, the forward modules 204 are configured to provide layer two and layer three any-service, any-port forwarding and processing capabilities, traffic management and local switching functionality, including simultaneous support for IP/MPLS and ATM/PNNI control planes. The forwarding modules 204 are fully connected to each of the port adaptors 202 in the switch 200 allowing any-port to any-port functionality.

Additionally, the switch 200 includes a management module 210 or the like configured to provide Operations, Administration, Maintenance, and Provisioning (OAM&P) functions associated with the switch 200. The management module 210 is interconnected to each of the port adaptors 202 and forwarding modules 204, such as through a backplane, mid-plane, or other data connection. Each module 202, 204 is configured to communicate status and other OAM&P data to the management module 210. The management module 46 communicates to a management system 212, such as a Network Management System (NMS), Element Management System (EMS), Craft Interface (CI), or the like. The communication can be local or remote over a network. The management system 212 allows a user to perform OAM&P functions. In the present invention, a user can utilize the management system 212 to set up and configure the dynamic path switching mechanisms described herein. For example, the user can set up the algorithm 70 and configure various parameters through the management system 212.

The present invention contemplates utilizing the dynamic path switching algorithms described herein on any SCTP-capable device. For example, within the IP Multimedia Subsystem (IMS) specifications, SCTP provides connections between various Session Initiated Protocol (SIP) servers and proxy servers, collectively called Call Session Control Function (CSCF). In addition to the switch 200, the dynamic path switching algorithm can operate on SIP servers, proxy servers, and the like.

Figure 6:
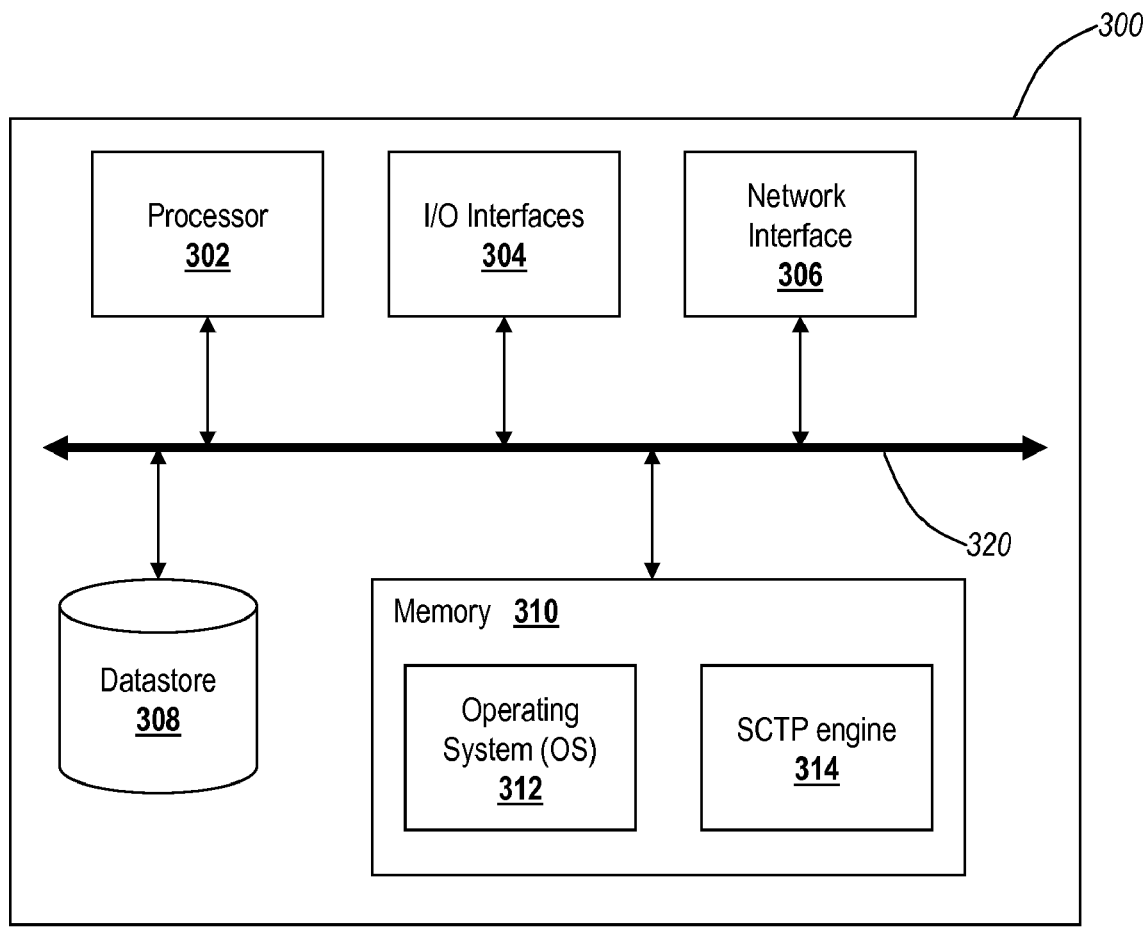
FIG. 6 illustrates a block diagram of a computer having an SCTP engine for providing dynamic path switching according to an exemplary embodiment of the present invention.

Referring to FIG. 6, a block diagram illustrates a computer 300 having an SCTP engine 314 for providing dynamic path switching according to an exemplary embodiment of the present invention. The computer 300 can be a digital computer that, in terms of hardware architecture, generally includes a processor 302, input/output (I/O) interfaces 304, network interfaces 306, a data store 308, and memory 310. In an exemplary embodiment, the computer 300 in communication with another computer 300, server, router, switch, or the like through two or more paths utilizing SCTP over the network interface 306.

The components (302, 304, 306, 308, and 310) are communicatively coupled via a local interface 320. The local interface 320 can be, for example but not limited to, one or more buses or other wired or wireless connections, as is known in the art. The local interface 320 can have additional elements, which are omitted for simplicity, such as controllers, buffers (caches), drivers, repeaters, and receivers, among many others, to enable communications. Further, the local interface 320 can include address, control, and/or data connections to enable appropriate communications among the aforementioned components.

The processor 302 is a hardware device for executing software instructions. The processor 302 can be any custom made or commercially available processor, a central processing unit (CPU), an auxiliary processor among several processors associated with the computer 300, a semiconductor-based microprocessor (in the form of a microchip or chip set), or generally any device for executing software instructions. When the computer 300 is in operation, the processor 302 is configured to execute software stored within the memory 310, to communicate data to and from the memory 310, and to generally control operations of the computer 300 pursuant to the software instructions.

The I/O interfaces 304 can be used to receive user input from and/or for providing system output to one or more devices or components. User input can be provided via, for example, a keyboard and/or a mouse. System output can be provided via a display device and a printer (not shown). I/O interfaces 304 can include, for example, a serial port, a parallel port, a small computer system interface (SCSI), an infrared (IR) interface, a radio frequency (RF) interface, and/or a universal serial bus (USB) interface.

The network interfaces 308 can be used to enable the computer 300 to communicate on a network, e.g., using SCTP with dynamic path switching. The network interfaces 306 can include, for example, an Ethernet card (e.g., 10BaseT, Fast Ethernet, Gigabit Ethernet), a wireless local area network (WLAN) card (e.g., 802.11a/b/g/n), or the like. The network interfaces 306 can include address, control, and/or data connections to enable appropriate communications on the network.

A data store 308 can be used to store data. The data store 308 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 can incorporate electronic, magnetic, optical, and/or other types of storage media. In one example, the data store 308 can be located internal to the computer 300 such as, for example, an internal hard drive connected to the local interface 320 in the computer 300. Additionally in another embodiment, the data store can be located external to the computer 300 such as, for example, an external hard drive connected to the I/O interfaces 304 (e.g., SCSI or USB connection). Finally in a third embodiment, the data store may be connected to the computer 300 through a network, such as, for example, a network attached file server.

The memory 310 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 can have a distributed architecture, where various components are situated remotely from one another, but can be accessed by the processor 302.

The software in memory 310 can include one or more software programs, each of which includes an ordered listing of executable instructions for implementing logical functions. The software in the memory system 310 includes the control loop 314 engine and a suitable operating system (O/S) 312. The operating system 312 essentially controls the execution of other computer programs, such as the control loop 314 engine, and provides scheduling, input-output control, file and data management, memory management, and communication control and related services. The operating system 312 can be any of Windows NT, Windows 2000, Windows XP, Windows Vista (all available from Microsoft, Corp. of Redmond, Wash.), Solaris (available from Sun Microsystems, Inc. of Palo Alto, Calif.), LINUX (or another UNIX variant) (available from Red Hat of Raleigh, N.C.), AIX (available from IBM Corporation), or any other operating system.

The dynamic path switching algorithm described herein is configured to run over the network interface 306. For example, the memory 310 can include the SCTP engine 314 for configuring and operating the dynamic path switching algorithm to ensure the computer 300 has an optimal path on a multi-homed SCTP connection.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A method for transport path selection for multi-homed paths in Stream Control Transmission Protocol, comprising:
   establishing a Stream Control Transmission Protocol association for two or more functioning paths, wherein the Stream Control Transmission Protocol association is transmitted over an underlying transport protocol;
   monitoring statistics on the two or more paths;
   comparing the statistics on the two or more paths;
   selecting an optimal path of the two or more paths responsive to the statistics;
   communicating the optimal path to a peer node;
   starting data transfer on the optimal path;
   if a primary path becomes the optimal path, reverting data transfer back to the primary path;
   continually selecting the optimal path in the Stream Control Transmission Protocol association while preventing route flipping in case of transient network conditions by preventing the selecting of the optimal path in the case of the transient network conditions; and
   transmitting Stream Control Transmission Protocol chunks to the peer node and receiving Stream Control Transmission Protocol chunks from the peer node;
   wherein the Stream Control Transmission Protocol chunks comprise any of algorithm on/off messages to enable/disable the transport path selection, switching request notification, switch request confirmation, and data messages comprising the statistics.

2. The method of claim 1, further comprising:
   checking if dynamic path switching is enabled prior to the monitoring step;

if dynamic path switching is not enabled, continuing normal Stream Control Transmission Protocol operation on the primary path.

3. The method of claim 1, further comprising:
waiting to receive an acknowledgment from the peer node prior to the starting step.

4. The method of claim 1, wherein the comparing step comprises:
applying a formula to each of the statistics from the two or more paths.

5. The method of claim 4, wherein the selecting step is performed responsive to the formula.

6. The method of claim 4, wherein the formula is a function comprising congestion window and round trip time for each of the two or more paths.

7. The method of claim 1, wherein the statistics comprise congestion window and round trip time for each of the two or more paths.

8. The method of claim 1, further comprising:
implementing a hysteresis loop to avoid route flipping under transient network conditions.

9. The method of claim 1, further comprising:
configuring a plurality of user-configurable parameters associated with the transport path selection;
wherein the plurality of user-configurable parameters comprise any of dynamic path switching on/off, revertive/non-revertive path switch, user preference/weighting to individual network paths, sampling frequency, number of samples to be considered for calculating a weighted average, and switching based on symmetric/asymmetric application requirements.

10. A device operating Stream Control Transmission Protocol, comprising:
a network interface connected to a network, wherein the network interface utilizes Stream Control Transmission Protocol transmitted over an underlying transport protocol;
two or more functioning paths in the network between the network interface and a peer node; and
a processor configured to control the network interface, wherein the processor is configured to execute dynamic path switching configured to:
establish a Stream Control Transmission Protocol association on the two or more paths between the network interface and the peer node;
monitor statistics on the two or more paths;
select an optimal path of the two or more paths responsive to the monitored statistics;
communicate the optimal path to the peer node;
transfer data on the optimal path;
if a primary path becomes the optimal path, reverting data transfer back to the primary path; and
continually select the optimal path in the Stream Control Transmission Protocol while preventing route flipping in case of transient network conditions by preventing the selecting of the optimal path in the case of the transient network conditions;
wherein the network interface and the peer node are each configured to transmit and receive a plurality of Stream Control Transmission Protocol chunks; and
wherein the Stream Control Transmission Protocol chunks comprise any of algorithm on/off messages to enable/disable the dynamic path switching, switching request notification, switch request confirmation, and data messages comprising the statistics.

11. The device of claim 10, wherein the processor is further configured to:
enable/disable dynamic path switching;
operate normal Stream Control Transmission Protocol operation on a primary path of the two or more paths if dynamic path switching is disabled.

12. The device of claim 10, wherein the processor is further configured to:
apply a formula to each of the statistics from the two or more paths, wherein the statistics are monitored at predetermined times, and wherein the statistics comprise congestion window and round trip time for each of the two or more paths;
use the formula to select the optimal path;
wherein the formula is a function comprising congestion window and round trip time for each of the two or more paths.

13. The device of claim 10, wherein the processor is further configured to:
continuously monitor and select the optimal path; and
operate a hysteresis loop to avoid path flipping under transient network conditions.

14. The device of claim 10, further comprising:
a plurality of user-configurable parameters associated with dynamic path switching;
wherein the plurality of user-configurable parameters comprise any of dynamic path switching on/off, revertive/non-revertive path switch, user preference/weighting to individual network paths, sampling frequency, number of samples to be considered for calculating a weighted average, and switching based on symmetric/asymmetric application requirements.

15. A network operating Stream Control Transmission Protocol, comprising:
a first node;
a second node; and
two or more functioning paths interconnecting the first node and the second node;
wherein the first node and the second node communicate utilizing Stream Control Transmission Protocol transmitted over an underlying transport protocol;
wherein the first node and the second node utilize a revertive dynamic path switching algorithm on the two or more paths to establish an association on the two or more paths and to continually select an optimal path of the two or more paths in the Stream Control Transmission Protocol responsive to monitored statistics while preventing route flipping in case of transient network conditions by preventing the selecting of the optimal path in the case of the transient network conditions;
a plurality of Stream Control Transmission Protocol chunks exchanged between the first node and the second node; and
wherein the Stream Control Transmission Protocol chunks comprise any of algorithm on/off messages to enable/disable the dynamic path switching, switching request notification, switch request confirmation, and data messages comprising the statistics.

16. The network of claim 15, wherein the monitored statistics comprise congestion window and round trip time for each of the two or more paths;
wherein the optimal path is selected based on a weighted function comprising the congestion window and the round trip time for each of the two or more paths.

17. The network of claim 15, further comprising:
a plurality of user-configurable parameters associated with dynamic path switching algorithm;
wherein the plurality of user-configurable parameters comprise switching based on symmetric/asymmetric application requirements.

* * * * *